United States Patent
Tonegawa

(10) Patent No.: US 7,733,518 B2
(45) Date of Patent: Jun. 8, 2010

(54) IMAGE PROCESSING APPARATUS WITH RESOLUTION DETERMINED BY PIXEL COUNT AND USED FOR PRINT IMAGE, METHOD, PROGRAM, AND RECORDING

(75) Inventor: Nobuyuki Tonegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1121 days.

(21) Appl. No.: 11/361,610

(22) Filed: Feb. 24, 2006

(65) Prior Publication Data
US 2006/0209318 A1    Sep. 21, 2006

(30) Foreign Application Priority Data
Mar. 15, 2005    (JP)    ............... 2005-073959

(51) Int. Cl.
*G06K 15/02*    (2006.01)
(52) U.S. Cl. ............... 358/1.2; 358/1.13; 358/1.18; 358/2.1; 358/537; 358/449; 358/1.14; 382/286; 382/299
(58) Field of Classification Search ............... 358/1.2, 358/1.14, 1.13, 1.18, 2.1, 537, 449; 382/218, 382/293, 298, 299, 194, 282, 286
See application file for complete search history.

(56) References Cited

U.S. PATENT DOCUMENTS

| | | | | |
|---|---|---|---|---|
| 5,613,045 A | * | 3/1997 | Morimoto et al. | 358/1.2 |
| 5,678,000 A | * | 10/1997 | Ohtani | 358/1.2 |
| 5,704,019 A | * | 12/1997 | Akiyama et al. | 358/1.1 |
| 6,333,792 B1 | * | 12/2001 | Kimura | 358/1.2 |
| 6,480,294 B1 | * | 11/2002 | Toyoda et al. | 358/1.15 |
| 6,819,442 B2 | * | 11/2004 | Takahashi | 358/1.15 |
| 7,092,113 B1 | * | 8/2006 | Saito et al. | 358/1.15 |
| 7,265,868 B2 | * | 9/2007 | Takahashi | 358/1.2 |
| 7,538,905 B2 | * | 5/2009 | Keithley | 358/1.2 |
| 7,564,578 B2 | * | 7/2009 | Saito et al. | 358/1.15 |

FOREIGN PATENT DOCUMENTS

JP    11-225263    8/1999

OTHER PUBLICATIONS http://www.ietf.org/rfc/rfc2301.txt, McIntyre, et. al., Network Working Group, Standards Track, Mar. 1998, pp. 1-77.

* cited by examiner

*Primary Examiner*—Twyler L Haskins
*Assistant Examiner*—Dennis Dicker
(74) *Attorney, Agent, or Firm*—Cowan, Liebowitz & Latman, P.C.

(57) ABSTRACT

There are provided an image generating apparatus, method, program, and recording medium that eliminate the need for specifying the size of paper on which a captured image is to be printed and are capable of printing the image on paper of a suitable size even when information about the paper size is unavailable. An MFP 101 obtains an image from a device such as a digital camera 105, extracts pixel count information from the image, and determines whether or not the image contains resolution information. If the image does not contain resolution information, the image is transformed to an image of a size that fits an A4-size sheet and the resolution of the image is determined on the basis of the pixel count information. Then, the size-transformed image is printed on an A4-size sheet with the determined resolution.

11 Claims, 10 Drawing Sheets

IMAGE PROCESSING APPARATUS WITH RESOLUTION DETERMINED BY PIXEL COUNT AND USED FOR PRINT IMAGE, METHOD, PROGRAM, AND RECORDING

FIELD OF THE INVENTION

The present invention relates to an image generating apparatus, method, program, and recording medium for printing images scanned through a scanner or taken with a digital camera, or images generated by a computer, for example.

BACKGROUND OF THE INVENTION

With the proliferation of computers and information networking in recent years, electronic mail (E-mail) for transmitting text information over a network has become widely used. Along with message body, which is text information, files in various formats can be sent as (E-mail) attachments. For example, Internet faxes (hereinafter abbreviated to "IFAX") which can transmit images as TIFF (Tag Image File Format) files attached to E-mail are widely used.

IFAX is a technology for communications between devices that enables a transmitting device to transform an image scanned through a scanner into the TIFF format and send the TIFF image and enables a receiving device to reproduce and print the image in the TIFF format from the data it has received.

One known example of such technology is RFC 2301, which is an IFAX image standard that specifies tags of resolution information and pixel count information in TIFF image files (see <URL:http:ietf.org/rfc/rfc2301.txt>). Another known technique adds information about sheet size to image data and sends and receives the data by E-mail (see Japanese Patent Laid-Open No. 11-225263).

When resolution or pixel count information is recorded in an image as described in RFC 2301, the size of the image (sheet size) can be obtained from the resolution and pixel count information. When resolution or sheet size information is recorded in an image as described in Japanese Patent Laid-Open No. 11-225263, pixel count information can be obtained from the information.

Images taken with digital cameras typically have pixel count information recorded on them, but not information about resolution or sheet (or image) size. Therefore, when an image taken with a digital camera is to be printed, a sheet size is typically specified by a user through a print application program to provide the sheet size information to cause the image to be printed on a sheet of the specified size.

However, there is a problem that when an image taken with a digital camera and attached to E-mail is to be printed on an IFAX machine, the image cannot properly be printed because the size of a sheet on which the image is to be printed cannot be determined unless resolution information or sheet size information is recorded in the attached image.

SUMMARY OF THE INVENTION

The present invention has been made in view of these circumstances and an object of the present invention is to provided an image generating apparatus, method, program, and recording medium that eliminates the need for specifying the size of paper on which a captured image is to be printed and are capable of printing the image on paper of a suitable size even when information about the paper size is unavailable.

To solve the problem, there is provided an image generating apparatus image generating apparatus including:
  obtaining unit adapted to obtain an image;
  extraction unit adapted to extract pixel count information indicating a pixel count of the image from the image;
  determination unit adapted to determine whether the image contains resolution information indicating the resolution of the image;
  transformation unit adapted to transform the image to an image having a size suitable for a predetermined sheet size if the determination unit determines that the image does not contain resolution information;
  resolution determination unit adapted to determine the resolution of the image on the basis of the pixel count information; and
  printing unit adapted to print the image the size of which has been transformed by the transformation unit, with the resolution determined by the resolution determination unit.

The image generating apparatus according to the present invention further includes setting unit adapted to set a sheet size larger than the size if the pixel count information extracted by the extraction unit exceeds a predetermined value,
  wherein the printing unit prints the image the size of which has been transformed by the transformation unit, with the resolution determined by the resolution determination unit.

The image generating apparatus according to the present invention further includes sheet determination unit adapted to determine whether a sheet of a size for printing the image is present or not prior to printing the image by the printing unit,
  wherein the printing unit prints the image on a sheet larger than the sheet size or prints an image produced through scale-down transformation of the image by the transformation unit on a sheet smaller than the size, if the sheet determination unit determines that a sheet of the size is not present.

The image generating apparatus according to the present invention further includes division unit adapted to divide the image into a plurality of images if the size of the image transformed by the transformation unit is larger than a sheet size set by the sheet size setting unit, wherein the printing unit prints the plurality of images resulting from the division by the division unit.

The image generating apparatus according to the present invention further includes margin adding unit adapted to add margins to the image size-transformed by the transformation unit to fit the image to the sheet size.

In the image generating apparatus according to the present invention, the margin adding unit adds margins to the image to fit the image to the sheet size if the size of the image obtained by the obtaining unit is smaller than a predetermined size, the size of the image being transformed by the transformation unit so as to fit the sheet size by interchanging the original R-direction and non-R direction of the image by the transformation unit.

The image generating apparatus according to the present invention further includes setting unit adapted to set the size of a sheet on which the image is to be printed, on the basis of resolution information and the pixel count information, if the determination unit determines that the image contains the resolution information indicating the resolution of the image;
  wherein the printing unit prints the image transformed by the transformation unit with the same scale as the original image on a paper of a sheet size set by the setting unit.

In the image generating apparatus according to the present invention, the obtaining unit obtains any of an image managed in another device connected to the image generating apparatus through a network and an image stored in a portable storage medium capable of being attached to and detached from the image generating apparatus.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

DETAILED DESCRIPTION OF THE PREFERRED EMBODIMENTS

A configuration of a network system including an information processing apparatus and a communication process performed in the network system according to an embodiment of the present invention will be described below in detail.

Figure 1:
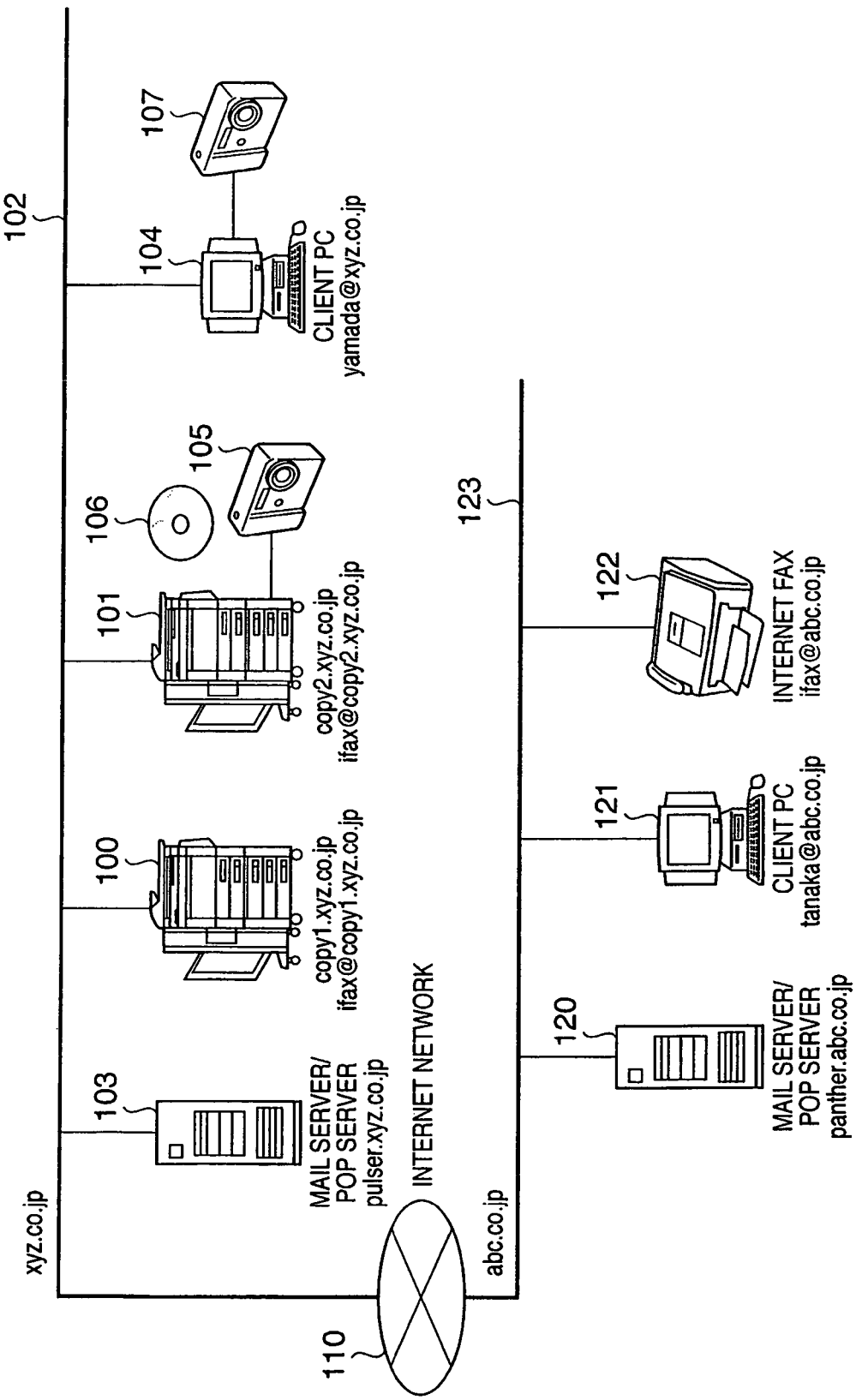
FIG. 1 is a diagram showing a configuration of a network system in which various devices having an information processing apparatus according to an embodiment of the present invention are interconnected through a network.

FIG. 1 shows a configuration of a network system in which various devices having an information processing apparatus according to the present invention are interconnected through a network. As shown in FIG. 1, multifunction peripherals (MFPs) 100 and 101 are equipped with a scanner and printer and have a copy function, a faxing function, and a printing function of printing data generated on a computer. The MFPs 100, 101 are connected onto a network 102 having the domain name "xyz.co.jp" and connected to a number of computers and various networked devices such as a Mail server/POP server 103 or a client PC 104.

The network 102 is further connected to the Internet 110 used worldwide and to a network 123 which has the domain name "abc.co.jp" and onto which a Mail server/POP server 120, a client PC 121, and an internet facsimile 122 are connected.

As shown in FIG. 1, assigned to the MFP 100 are the host name "copy1.xyz.co.jp" and the device E-mail address "ifax@copy1.xyz.co.jp". Assigned to the MFP 101 are the host name "copy2.xyz.co.jp" and the device E-mail address "ifax@copy2.xyz.co.jp". A digital camera 105 can be connected to the MFP 101 and a removable medium, which is a portable storage medium such as a CD-ROM or DVD, can also be connected to the MFP 101 to send and receive an image and other information between them. The same applies to the MFP 100.

General-purpose E-mail software is installed in the client PC 104 and the E-mail address "yamada@xyz.co.jp" is assigned to it. The client PC 104 can be connected with a digital camera 107 and is capable of inputting and outputting information such as images to and from the digital camera 107. The Mail server/POP server 103 has the functions of both mail server and pop server.

General-purpose E-mail software is installed in the client PC 121 and the E-mail address "tanaka@abc.co.jp" is assigned to it. General-purpose E-mail software is also installed in the internet facsimile and the E-mail address "ifax@abc.co.jp" is assigned. The Mail server/POP server 120 has the functions of both mail serer and POP server.

For example, in the system shown in FIG. 1, when E-mail is to be sent from the client PC 104 to the destination "tanaka@abc.co.jp", E-mail data created by using the E-mail software on the client PC 104 is transferred to the Mail sever/POP server 103 through use of the SMPT (Simple Mail Transfer Protocol) protocol. The E-mail data is then transferred from the Mail server/POP server 103 to the Mail server/POP server 120 through use of the SMTP protocol over the Internet 110, and stored in a mail box having the address "tanaka@abc.co.jp" in the server 120.

As described above, general-purpose E-mail software is installed in the client PC 121, which monitors the mail box of the address "tanaka@abc.co.jp" in the Mail server/POP server 120 from the client PC 121 at regular intervals using the POP3 (Post Office Protocol-Version 3) protocol to see whether an E-mail from the client PC 121 has arrived at the server 120. If the E-mail has arrived at the server 120, the E-mail software receives it.

On the other hand, when an E-mail is sent from the address "tanaka@abc.co.jp" of the client PC 121 to the address "yamada@xyz.co.jp" of the client PC 104, the E-mail travels the above-described route in reverse. That is, E-mail data created using general-purpose E-mail software installed on the client PC 121 is sent to the Mail server/POP server 103 through the Mail server/POP server 120 and is stored in the E-mail box having the address "yamada@xyz.co.jp" in the Mail server/POP server 103. The client PC 104 obtains from the E-mail box with the address "yamada@xyz.co.jp" the E-mail data which has sent using the POP3 protocol.

The MFPs 100, 101 have "E-mail transmission mode"and "IFAX transmission mode" in FIG. 1. The E-mail transmission mode is intended for sending images received through use of the facsimile (FAX) or Internet facsimile (IFAX) receiving function as well as monochrome/color images scanned through a scanner to normal E-mail addresses; the IFAX transmission mode is intended for sending such image to IFAX-compliant devices.

The MFPs 100, 101 use the SMTP and POP3 mentioned above to send and receive data in a manner similar to that in the client PCs 104, 121.

The MFPs 100, 101 in the E-mail transmission mode can send images in JPEG format or PDF (Portable Document Format) files scanned through the scanner as color images. The MFPs 100, 101 in E-mail transmission mode can send TIFF or PDF images scanned through the scanner as monochrome images. When an E-mail is sent from these devices to the E-mail-address "yamada@xyz.co.jp" assigned to the client PC 104, the client PC 104 can receive the E-mail using the POP3 protocol and can display the images using a general-purpose image viewer.

In the IFAX transmission mode, these devices send images scanned by the scanner to another IFAX-compliant MFP or Internet FAX 122 as TIFF-format images conforming to RFC 2301 by using the SMPTP and POP3 protocol.

In these devices, image data received by using receiving capability of the scanner, FAX, or IFAX of a sending device can be received by a receiving device in a remote place and the received image can be printed on a printer or the like in a remote place.

Figure 2:
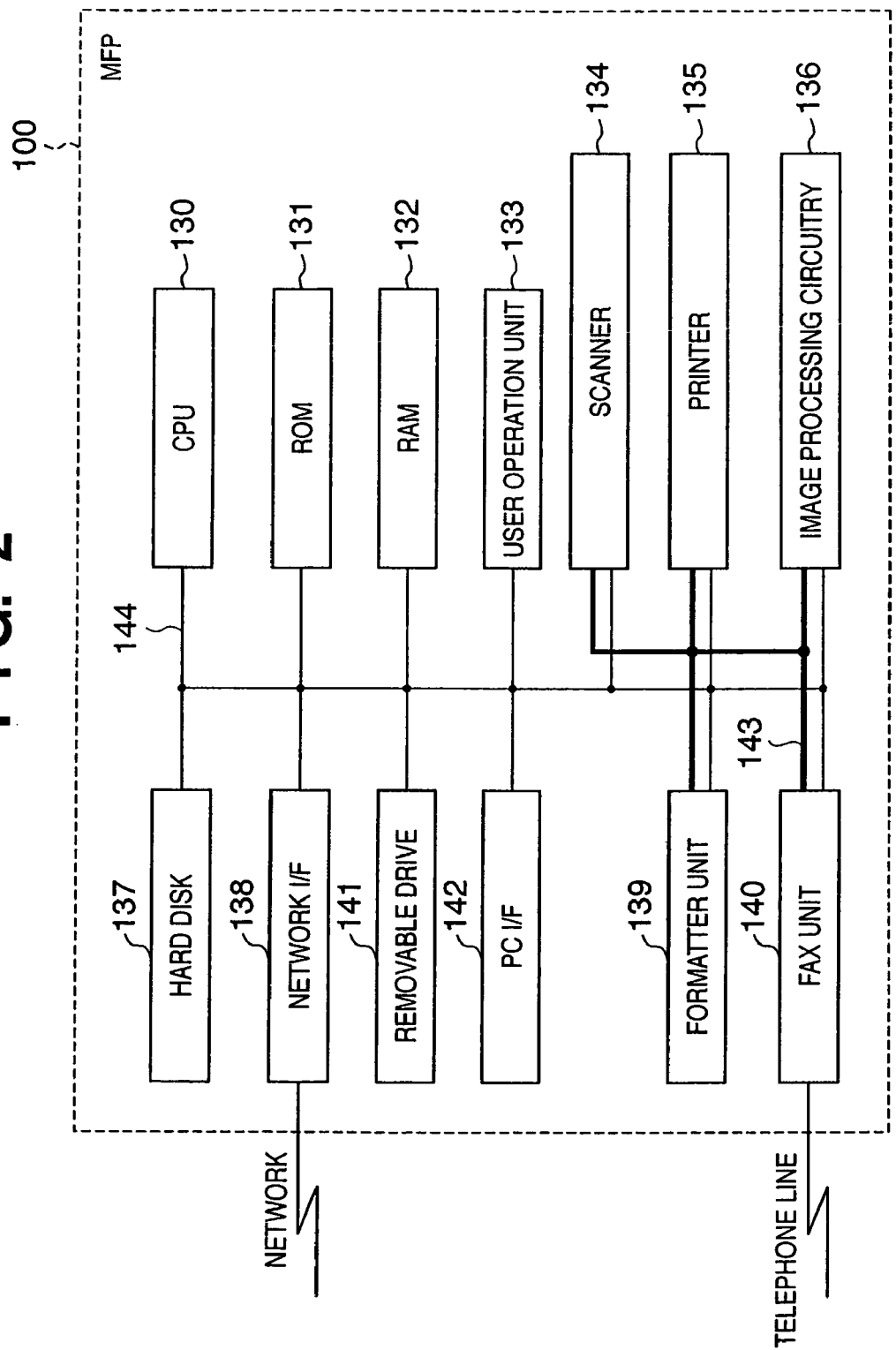
FIG. 2 is a block diagram showing a detailed configuration of a multifunctional peripheral (MFP) 101 shown in FIG. 1.

FIG. 2 is a block diagram showing a detailed configuration of the MFP 101 shown in FIG. 1. In the following description, only the MFP 101 out of the MFPs shown in FIG. 1 will be described. The other MFP 100 has a configuration similar to that of the MFP 101.

In FIG. 2, a central processing unit (CPU) 130 is a control circuit that uses a program stored in a ROM 131, and a temporary memory area in a RAM 132, which functions as a program memory, to control the overall system of the MFP 100.

A user operation unit 133 includes a liquid-crystal display (LCD) panel and hard keys such as a start key and ten-keys, displays buttons through a touch-sensitive panel on the LCD, detects the position of the button touched by a user's finger, and efficiently performs a user operation based on the detected position.

Figure 10:
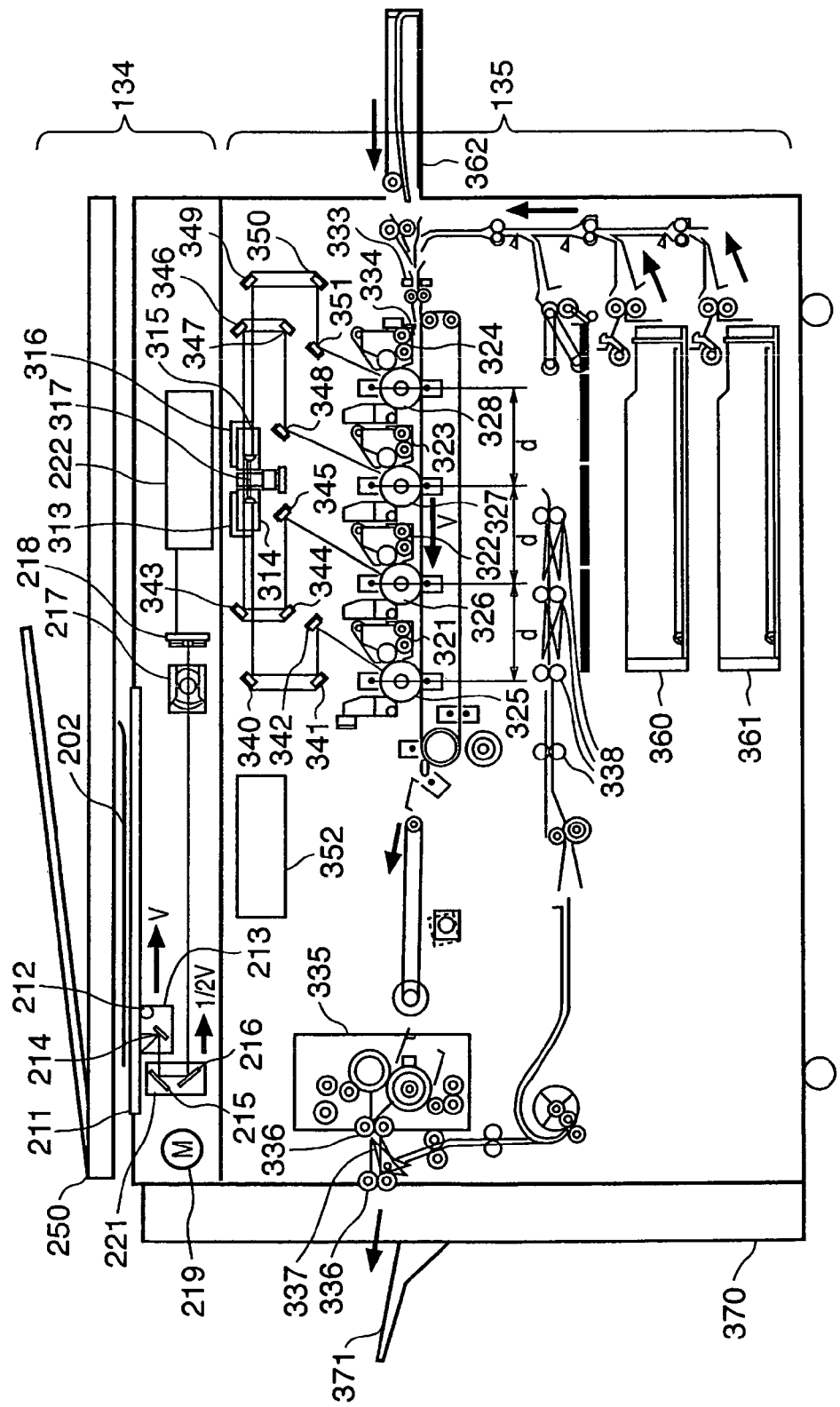
FIG. 10 is a diagram showing components of the scanner 134 and printer 135 of the MFP 100 shown in FIG. 1.

A scanner 134 is a unit that converts image data scanned from an original into electrical data through photoelectric conversion. FIG. 10 shows components of the scanner 134 and a printer 135 of the MFP 100 shown in FIG. 100. In the scanner 134, an original is carried from a document feeder 250 onto a platen glass 211. When the original arrives the platen glass 211, a lamp 212 is turned on and a scanner unit 213 starts to move to perform exposure scanning of the original. Light reflected from the original is guided by mirrors 214, 215, and 216 and a lens 217 to a CCD image sensor 218, where the light is converted into an electric signal, and the electric signal is transformed by an A/D converter into digital data. After the completion of scanning of the original, the original is discharged from the platen glass 211.

The printer 135 is a unit for printing electric image data on recording paper. In the printer 135, laser emitting units 313, 314, 315, and 316 emit laser light according to electric image data, and the laser light is applied to a photosensitive drums 325, 326, 327 and 328 to form a latent image according to the laser light. Toner units 321, 322, 323, and 324 cause toner to stick to the latent image on the photosensitive drums 325, 326, 327, and 328. A recording paper sheet is fed from a paper supply cassette 360, 361, 362 to a transfer unit in synchronization with the start of irradiation of laser light and the toner on the photosensitive drums 325, 326, 327, 328 is transferred to the recording paper sheet. The recording paper sheet bearing toner is carried to a fuser 335, where the toner is fused onto the recording paper sheet with the heat and pressure applied by the fuser 335. After passing through the fuser 335, the recording paper sheet is ejected by an ejection roller 336. A sorter provides ejected recording paper sheets into bins to sort the sheets.

The image processing circuit 136 in FIG. 2 includes a large-capacity image memory, an image rotation circuit, a resolution scaling circuit, and a coder/decoder circuit compliant with a standard such as MH, MR, MMR, JBIG, or JPEG, and is capable of performing various kinds of image processing such as shading, trimming, and masking. A hard disk 137 is a mass-storage recording medium connected through an interface such as a SCSI or IDE interface.

A network interface (I/F) 138 in FIG. 2 is a circuit that provides a network data link to an Ethernet (registered trademark) network such as 10BASE-T or 100BASE-T, or a token ling network.

A formatter unit 139 is a rendering circuit for generating image data from PDL (Page Description Language) data received from a PC through an IEEE 1284 compliant parallel interface or through a PC interface circuit such as USB, or through a network interface circuit, and performing image processing in the image processing circuit 136, and printing the image on the printer 135.

A fax unit 140 is a facsimile interface circuit that connects to a telephone line and includes circuits such as NCU (Network Control Unit), and MODEM (Modulator/DEModulator).

In the MFP 101, image data scanned through the scanner 134 is subjected to image processing in the image processing unit 136, and is then sent to another facsimile machine through the telephone line, or data received from another facsimile machine is subjected to image processing in the image processing circuit 136 and is then printed on the printer 135.

The scanner 134, printer 135, image processing circuit 136, formatter 139, and fax unit 140 described above are interconnected through a fast video bus 143 different from the CPU bus 144 of the CPU 130, and can transfer image data at a high speed.

The MFP 101 implements the copy function by applying image processing to image data scanned by the scanner 134 in the image processing circuit 136 and printing the scanned image on the printer 136.

Furthermore, the MFP 101 includes a Send function that sends image data scanned through the scanner 134 and subjected to image processing in the image processing circuit 136 to a network through the network interface, or an IFAX function that generates an RFC 2301-compliant image in the image processing circuit 136 and sends and receives data using an E-mail protocol.

A removable drive 141 is a drive to which an optical recording medium such as an MO, CD-ROM, and DVD, or a magnetic recording medium such as a removable hard disk, and a floppy (registered trademark) disk, or a semiconductor memory such as a CF card, SD card, and USB memory can be attached. The removable drive 141 can read and write data to and from a recording medium attached.

Figure 3:
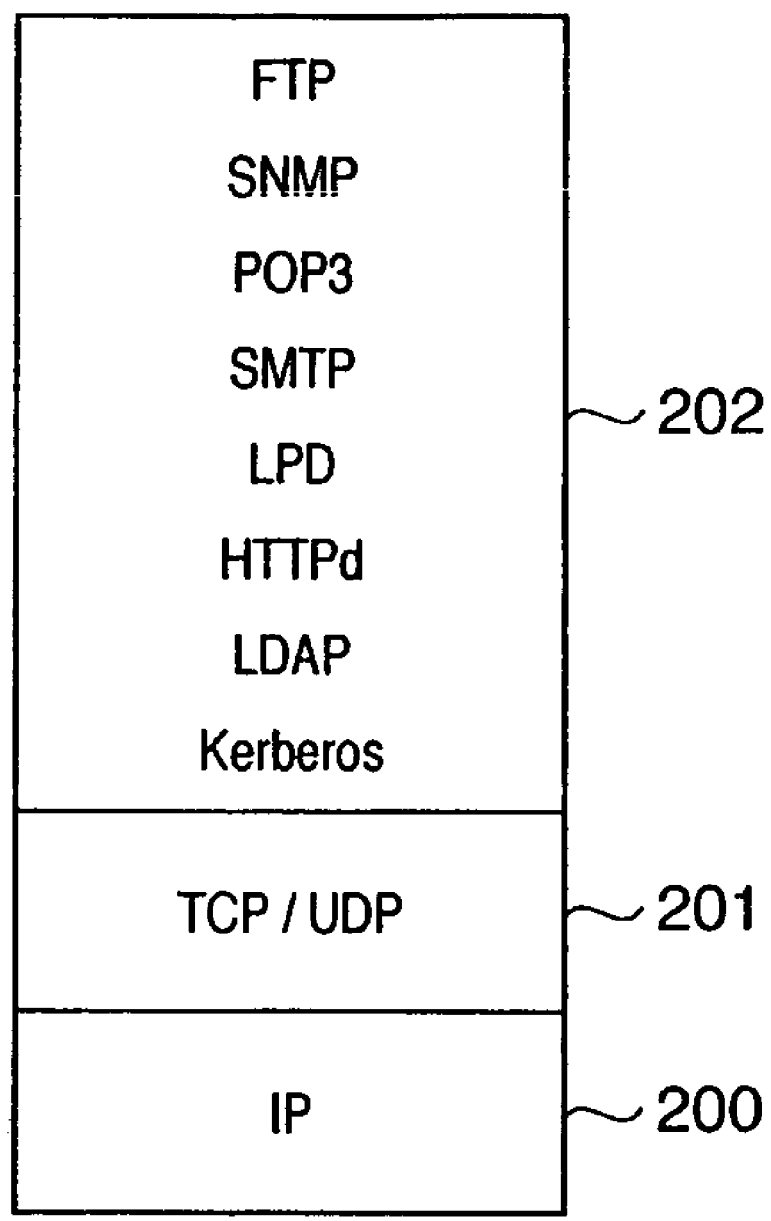
FIG. 3 is a diagram illustrating network programs included in the MFP 101.

FIG. 3 is a diagram illustrating network programs contained in the MFP 101. As shown in FIG. 3, the network programs in the MFP 100 can be broadly classified into three layers: an IP (Internet Protocol) 200 layer, TCP (Transmission Control Protocol)/UDP (User Datagram Protocol) 201 layer, and an application-layer protocols 202.

IP 200 is a protocol layer of the Internet that provides services for delivering messages from an initiating host to a destination host in cooperation with a relaying node such as a router. IP 200 performs a routing function for managing source addresses of sending ends of data and destination addresses of receiving ends of the data and managing routing of data over the network according to address information.

TCP/UDP 201 is a transport layer that provides services for delivering messages from an initiating application process to a receiving application process. TCP is a connection-oriented service, which guarantees high reliability of communications. UDP is a connectionless service, which does not guarantee reliability of communications.

Multiple protocols 202 are specified in the application layer, including FTP (File Transfer Protocol), which is a file transfer service protocol, SNMP, which is a network management protocol, LPD, which is a server protocol for printing on printer, HTTP, which is a protocol for WWW (World Wide Web) servers, SMTP (Simple Mail Transfer Protocol) which is a protocol for E-mail transmission and reception, POP3 (Post Office Protocol Version 3) which is a mail download protocol, and LDAP (Lightweight Directory Access Protocol), which is a protocol for accessing a directory database that manages user E-mail addresses. In addition, Kerberos authentication program defined in RFC 1510 is included.

Figure 4A:
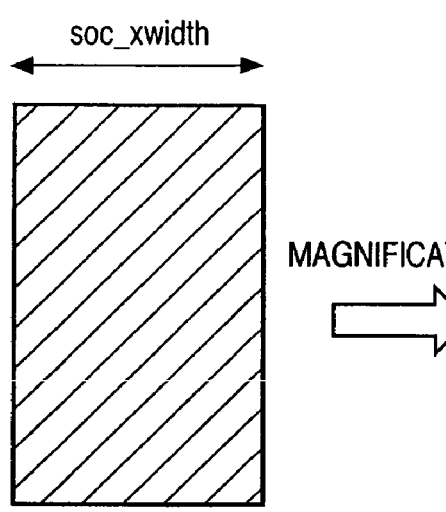
FIGS. 4A to 4C are diagrams illustrating an overview of an image transformation process for printing an obtained digital image on paper.
Figure 4B:
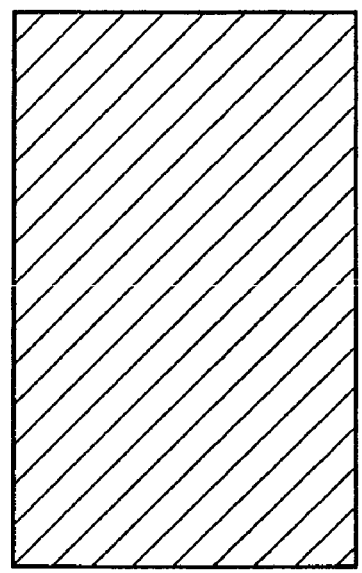
Figure 4C:
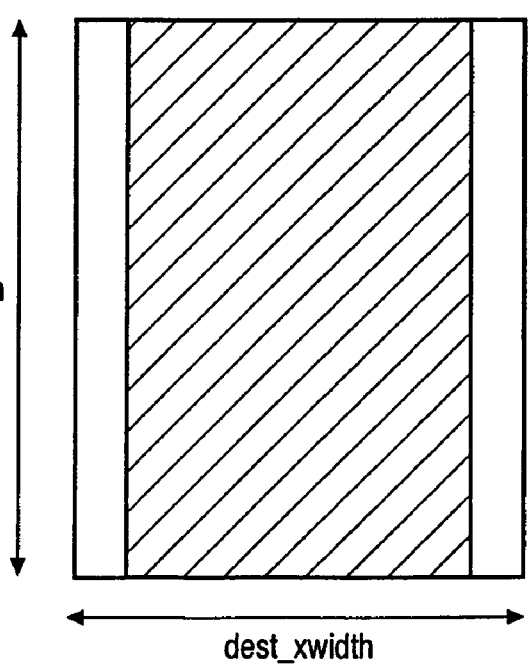

FIGS. 4A to 4C are diagrams illustrating an overview of an image transformation process for printing an obtained digital image on a sheet. The following is a description with respect to FIGS. 4A to 4C of how image transformation is performed in order to lay out an image taken with a digital camera (that is, an image that has pixel count information recorded as image data that can be extracted, but does not contain information such as resolution information or sheet size (image size) information for identifying the sheet size) so that the image is printed on an A4-size paper sheet most commonly used in typical MFPs.

FIG. 4A shows an image taken with a digital camera and received and loaded in an MFP. The number of pixels in the horizontal, main scanning direction is denoted as soc_xwidth. FIG. 4B shows an image produced by magnifying the image shown in FIG. 4A by a certain scaling factor obtained by calculation. FIG. 4C shows an image in which about 20-mm page margins are provided on both sides of the image shown in FIG. 4B (in the present embodiment, the margins are provided on the left and right to the image in the main scanning direction). The horizontal pixel count, dest_xwidth, of the image generated through this process is equal to the pixel count defined in RFC 2301, which, as well as the vertical-direction pixel count dest_ywidth, is suitable for the size of a paper sheet on which the image is to be printed.

Figure 5A:
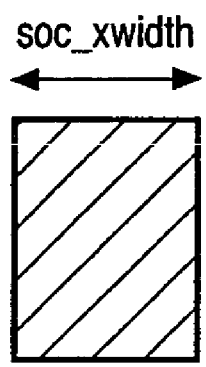
FIGS. 5A and 5B show examples in which a small image captured by a relatively low-resolution digital camera incorporated in a cellular phone or the like is transformed.
Figure 5B:
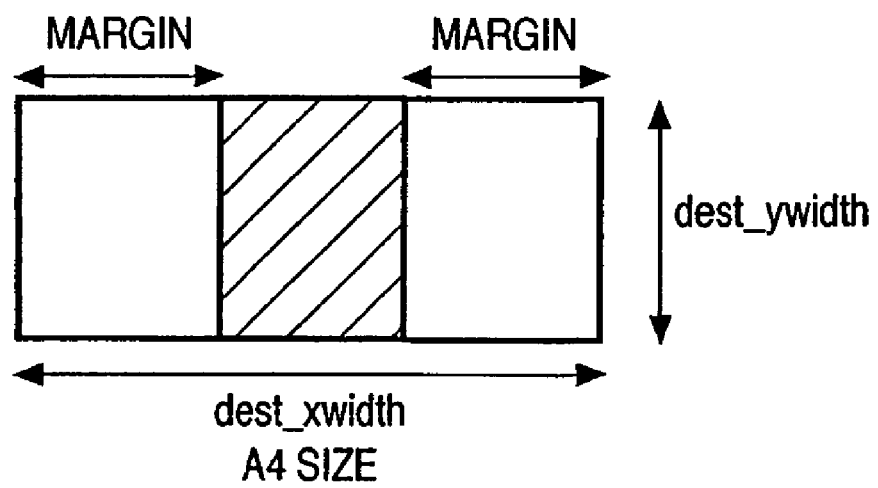

FIGS. 5A and 5B show an example in which image transformation is applied to a small image taken with a relatively low-resolution digital camera incorporated in a cellular phone or the like. The following is a description of how the image transformation is performed in order to lay out an image with a relatively small number of pixels that was captured with a relatively low-resolution digital camera incorporated in a cellular phone or the like and does not contain resolution information or sheet size (image size) information used for identifying the sheet size, so that the image can be printed on an A4-size sheet, which is most often used in MFPs.

FIG. 5A shows an image taken with a relatively low-resolution digital camera incorporated in a cellular phone or the like. The horizontal, main scanning pixel count is denoted as soc_xwidth. The image is a color image and therefore is treated as an image with a resolution of 100×100 dpi specified in the RFC2301 color image standard. As shown in FIG. 5B, page margins are added on both sides of the image so that the image is centered in an A4-size sheet (in the present embodiment, the margins are provided on left and right to the image). That is, the size of the image is changed by replacing the R-direction and the non-R direction with the original directions so that the image fit in the sheet, and margins are added. As a result, the horizontal, main scanning pixel count of the image including the margins becomes dest_xwidth and the horizontal, sub-scanning pixel count becomes dest_ywidth, both of which are suitable for the size of the sheet on which the image is to be printed.

Figure 6:
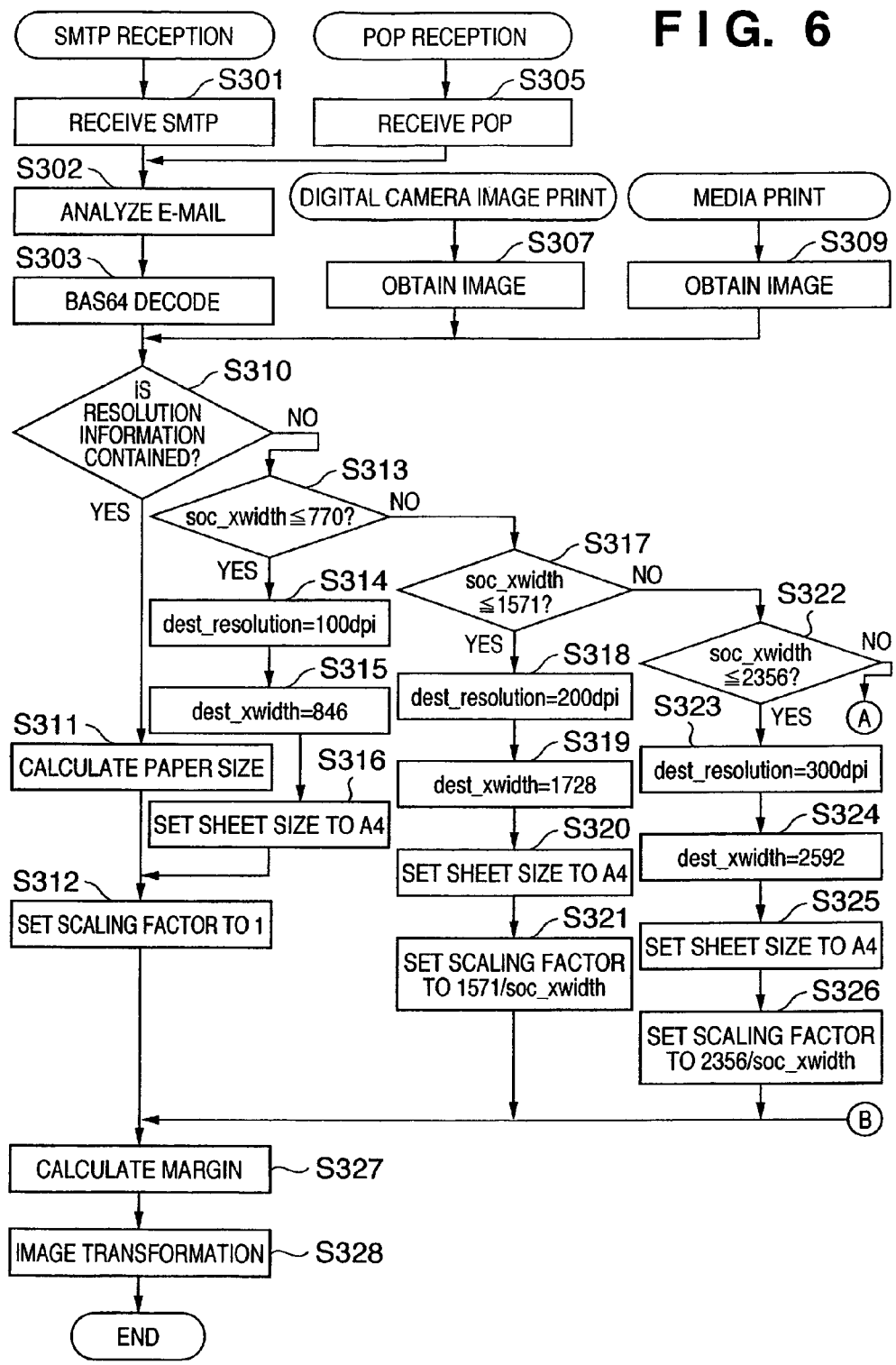
FIG. 6 is a flowchart illustrating an image transformation process performed by an MFP 101 for printing a digital image obtained or set in the MFP 101 on particular paper according to an embodiment of the present invention.
Figure 7:
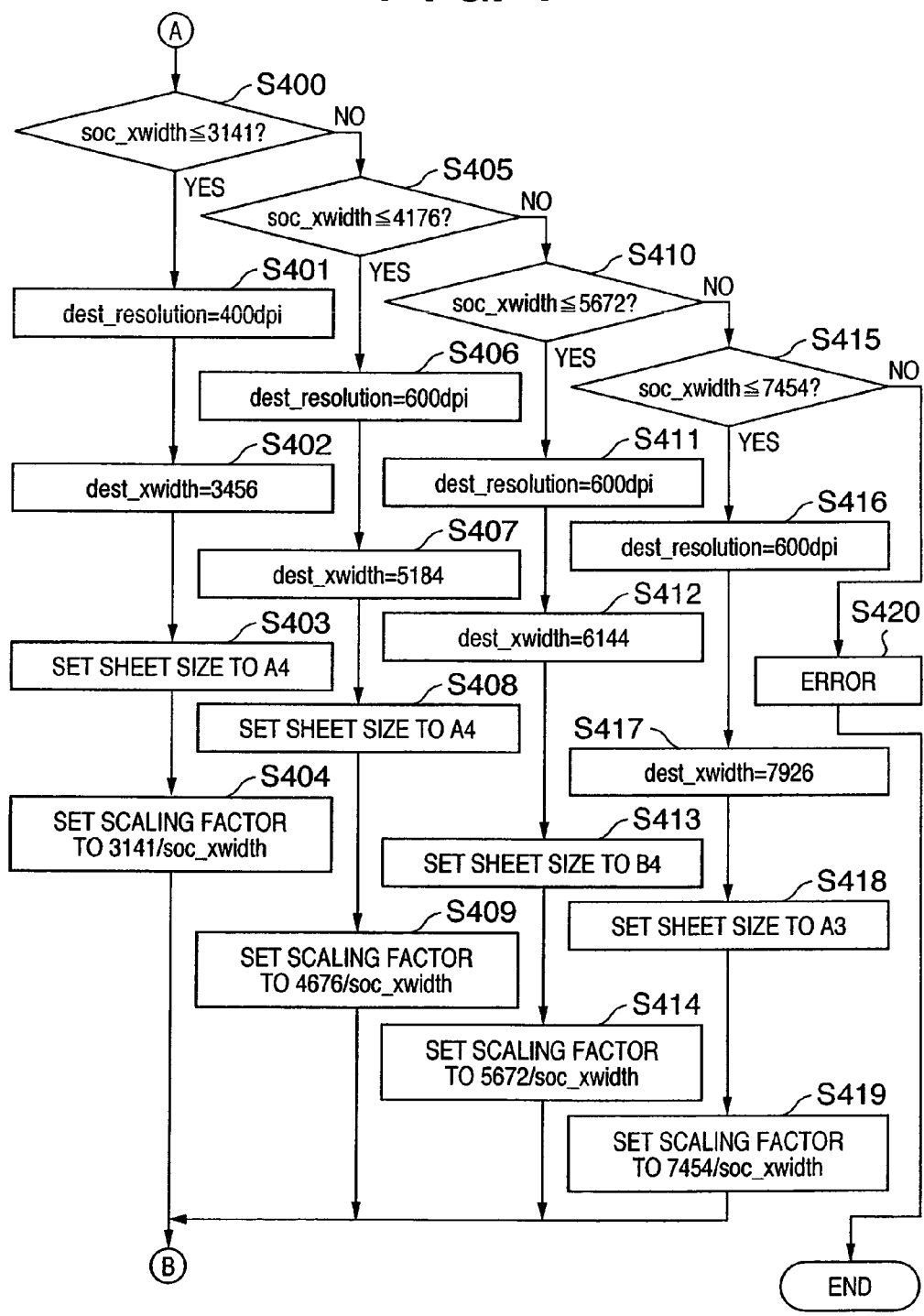
FIG. 7 is a flowchart illustrating an image transformation process performed by an MFP 101 for printing a digital image obtained or set in the MFP101 on particular paper.

FIGS. 6 and 7 are flowcharts illustrating an image transformation process for printing a digital image obtained by or set in an MFP 101 according to an embodiment of the present invention. In particular, a "digital camera image print" process and a "media print" process will be described. In the "digital camera image print", an image attached to E-mail is received by using an E-mail reception protocol, SMTP or POP3, and is printed without needing sheet size selection on a digital camera 105. In the "media print", one of the images stored in a removable medium 106 is selected and printed without needing sheet size selection.

First, SMTP reception processing is started with SMTP reception (step S301). Then, MIME information in the E-mail or the like is analyzed (step S302), the attached file is decoded based on BASE64, character codes in the E-mail data are converted into binary image data (step S303).

On the other hand, when E-mail is received using the POP3 protocol, the POP receiving process starts with POP reception (step S305). As in the case of the SMTP-based data reception, MIME information or the like in the received data is analyzed (step S302), the attached file is decoded based on BASE64, and character codes in the E-mail data are converted into binary image data (step S303).

When digital camera image printing is to be performed without selecting a sheet size on the digital camera 105, a digital print process is activated (step S306) and image data is obtained from the digital camera 105 (step S307). The process then proceeds to step S310 in order to perform processing of the obtained image.

When a removable medium 106 is connected to the removable drive 141, a media print process in which printing is performed without needing sheet size selection is activated, and image data is obtained from the removable medium 106 (step S309). Then, the process proceeds to step S310 in order to perform processing of the obtained image.

At step S310, the obtained image is checked to determine whether or not it has resolution information recorded on it (whether or not it contains resolution information). If it contains resolution information (Yes), then the resolution information and pixel count information recorded in the image are extracted and the size of a sheet on which the image is to be printed is calculated based on the extracted information (step S311), and a scaling factor of 1 is set for the image (step S312). Then, the process proceeds to step S327.

At step S327, the size of page margins is calculated. In particular, if the horizontal, main scanning size of the image is smaller than the sheet size, this calculation is performed to obtain the number of pixels of the width of the left and right margins in which white pixels are to be embedded so that the image is centered on the sheet. Then, the obtained image is transformed on the basis of the calculated scaling factor and margin size (step S328). The process will then end.

On the other hand, if it is determined at step S310 that the image does not contain resolution information (No), only pixel count information is extracted and it is determined whether or not the pixel count of the image in the main scanning direction soc_xwidth is less than or equal to 770 (step S313). If the number of pixels in the main scanning direction soc_xwidth is less than or equal to 770 (Yes), resolution information after image transformation dest_resolution is set to 100 dpi (step S315), the number of pixels in the main scanning direction after image transformation dest_xwidth is set to 846 (step S315), and the sheet size is set to A4 (step S316).

The process then proceeds to step S312, where the scaling factor is set to 1. Then, as a result of the image transformation at step S328, the image is transformed to a 100-dpi image and margins are provided on the left and right to the image in such a manner that the image fits a sheet having the length of 4A size in the main scanning direction and the image is centered on the sheet as shown in FIG. 5B.

On the other hand, if it is determined at step S313 that the number of pixels in the main scanning direction soc_xwidth is greater than 770 (No), determination is made as to whether or not the number of pixels in the main scanning direction soc_xwidth is less than or equal to 1,571 (step S317). If the number of pixels in the main scanning direction soc_xwidth is less than or equal to 1,571 (Yes), the resolution information after image transformation dest_resolution is set to 200 dpi (step S318) and the number of pixels in the main scanning direction after image transformation dest_xwidth is set to 1728 dpi (step S319), the sheet size is set to A4 (step S320), and the scaling factor is set to 1,571 divided by the value of soc_xwidth (step S321).

Then, the process proceeds to step S327, where the size of margins is calculated, and then image transformation is performed (step S328). As a result, the image is transformed to a 200-dpi image and a margin of approximately 20 mm is provided on the left and right to the image so that the image fits a sheet having the size of A4 size sheet in the main scanning direction and the image is centered on the sheet as shown in FIG. 4C.

On the other hand, if it is determined at step S317 that the number of pixels in the main scanning direction soc_xsidt is greater than 1,571 (No), determination is made as to whether or not the number of pixels in the main scanning direction soc_xwidth is less than or equal to 2,356 (step S322). If the number of pixels soc_xwidth in the main scanning direction is less than or equal to 2,356 (Yes), the resolution information after image transformation dest_resolution is set to 300 dpi (step S323), the number of pixels in the main scanning direction dest_xwidth is set to 2,592 (step S324), the sheet size is set to A4 (step S325), and the scaling factor is set to 2,356 divided by the number of soc_xwidth (step S326).

The process then proceeds to step S327, where the size of margins is calculated, and image transformation is performed (step S328) As a result, the image is transformed to a 300-dpi image and margins of approximately 20 mm are provided on the left and right of the image so that the image is centered on the sheet having the size of A4 size in the main scanning direction as shown in FIG. 4C.

If it is determined at step S322 that the number of pixels in the main scanning direction soc_xwidth is greater than 2,356 (No), determination is made as to whether or not the number of pixels in the main scanning direction soc_xwidth is less than or equal to 3,141 (step S400). If the number of pixels in the main scanning direction soc_xwidth is less than or equal to 3,141 (Yes), the resolution information after image transformation dest_resolution is set to 400 dpi (step S401), the number of pixels in the main scanning direction after image transformation dest_xwidth is set to 3,456 (step S402), the sheet size is set to A4 (step S403), and the scaling factor is set to 3,141 divided by the number of soc_xwidth (step S404).

Then, the process proceeds to step S327, where the size of margins is calculated, and the image transformation is performed (step S328). As a result, the image is transformed to a 400-dpi image and margins of approximately 20 mm are provided on the left and right of the image so that the image is centered on the sheet having the size of A4 size in the main scanning direction as shown in FIG. 4C.

On the other hand, if it is determined at step S400 that the number of pixels in the main scanning direction soc_xwidth is greater than 3,141 (No), determination is made as to whether or not the number of pixels in the main scanning direction soc_xwidth is less than or equal to 4,676 (step S405). If the number of pixels in the main scanning direction soc_xwidth is less than or equal to 4,676 (Yes), the resolution information after image transformation dest_resolution is set to 600 dpi (step S406), the number of pixels in the main scanning direction after image transformation dest_xwidth is set to 5,184 (step S407), the sheet size is set to A4 (step S408), and the scaling factor is set to 4,676 divided by the value of soc_xwidth (step S409).

Then, the process proceeds to step S327, where the size of margins is calculated, and then image transformation is performed (step S328). As a result, the image is transformed to a 600-dpi image and margins of approximately 20 mm are provided on the left and right of the image so that the image is centered on the sheet having the size of A4 size in the main scanning direction as shown in FIG. 4C.

On the other hand, if it is determined at step S405 that the number of pixels in the main scanning direction soc_xidth is greater than 4,676 (No), determination is made as to whether or not the number of pixels in the main scanning direction soc_xwidth is less than or equal to 5,672 (step S410). If the number of pixels in the main scanning direction soc_xwidth is less than or equal to 5,672 (Yes), the resolution information after image transformation dest_resolution is set to 600 dpi (step S411), the number of pixels in the main scanning direction after image transformation dest_xwidth is set to 6,144 (step S412), the sheet size is set to B4 (step S413), and the scaling factor is set to 5,672 divided by the value of soc_xwidth (step S414).

Then, the process proceeds to step S327, where the size of margins is calculated, and image transformation is performed (step 328). As a result, the image is transformed to a 600-dpi image and margins of approximately 20 mm are provided on the left and right of the image so that the image is centered on the sheet having the size of B4 size in the main scanning direction as shown in FIG. 4C.

On the other hand, if it is determined at step S410 that the number of pixels in the main scanning direction soc_xwidth is greater than 5,672 (No), determination is made as to whether or not the number of pixels in the main scanning direction soc_xwidth is less than or equal to 7,454 (step S415). If the number of pixels in the main scanning direction soc_xwidth is less than 7,454 (Yes), the resolution information after image transformation dest_resolution is set to 600 dpi (step S416), the number of pixels in the main scanning direction after image transformation dest_xwidth is set to 7,926 (step S417), the sheet size is set to A3 (step s418), and the scaling factor is set to 7,454 divided by the value of soc_xwidth (step S419).

Then, the process proceeds to step S327, where the size of margin is calculated, and image transformation is performed (step S328) As a result, the image is transformed to a 600-dpi image and margins of approximately 20 mm are provided on the left and right of the image so that the image is centered on the sheet having the size of A3 size in the main scanning direction as shown in FIG. 4C.

It should be noted that if the number of pixels in the main scanning direction soc_xwidth is greater than 7,454 (No) at step S415, it is determined that an error has occurred (step S420), and the process is terminated. In this case, for example, the image may be divided into two so that each can be printed on one sheet, and the two images may be printed on two sheets.

Figure 8:
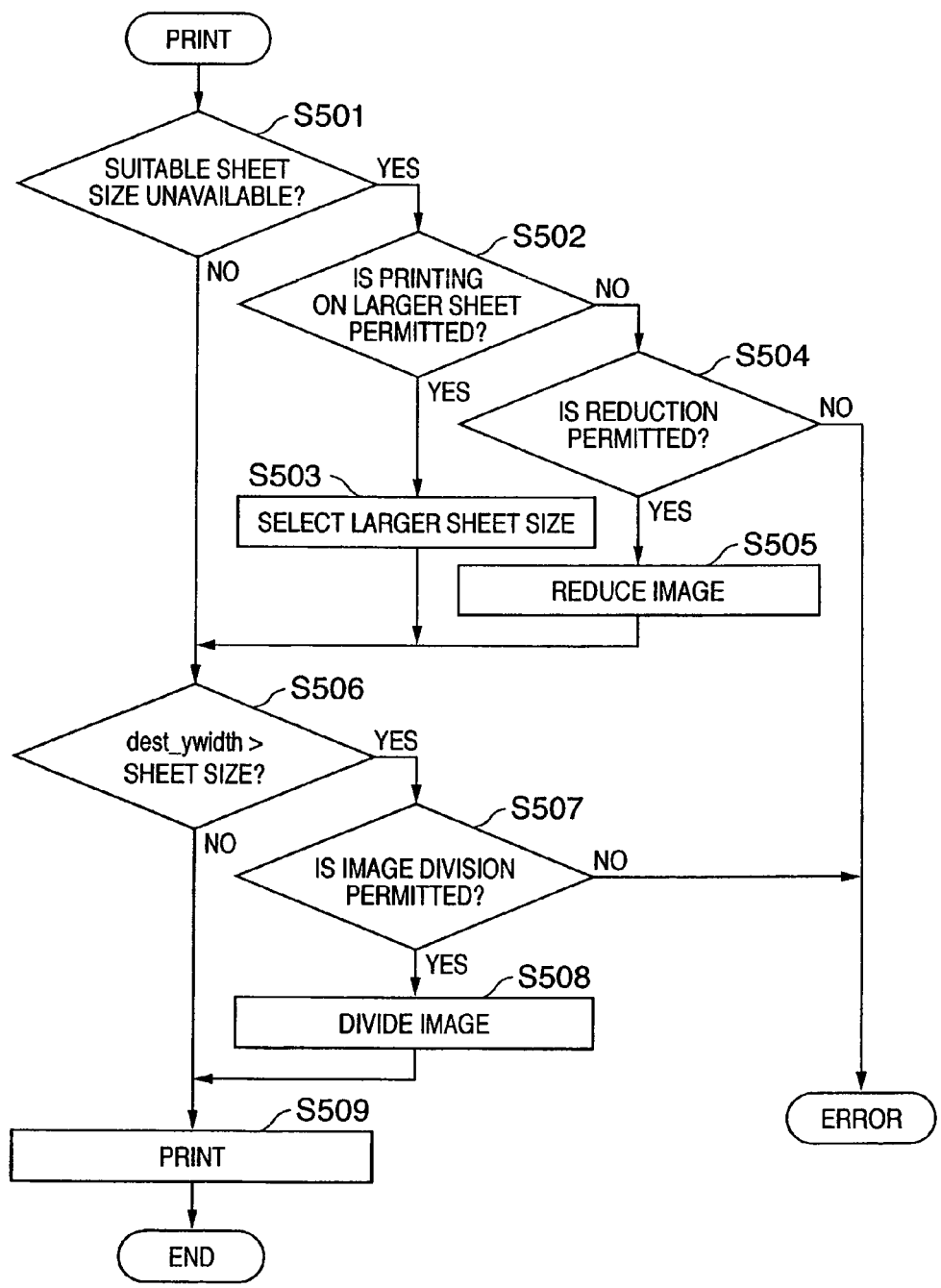
FIG. 8 is a flowchart illustrating a process for printing an image generated on the MFP 101 on paper through the process shown in the flowcharts in FIGS. 6 and 7.

FIG. 8 is a flowchart illustrating a process for printing an image generated on an MFP 101 through the process shown in the flowchart in FIGS. 6 and 7. First, when a print process is activated, the MFP 101 determines whether or not any of the sheet supply cassettes contains sheets suitable for printing the image generated through the image transformation at step S328 (step S501). If suitable sheets are contained (No), the process proceeds to step S506.

On the other hand, if suitable sheets are unavailable (Yes), determination is made as to whether printing on a sheet larger than a sheet of suitable size is permitted (step S502) If printing on a sheet larger than the suitable size is permitted by selecting a setting switch for selecting a larger paper size provided on the MFP 101 (Yes), a larger size of sheet contained in any of the sheet supply cassettes is set (step S503), then the process proceeds to step S506.

On the other hand, if it is determined at step S502 that printing on a larger sheet is not permitted (No), determination is made as to whether to reduce the image and print the reduced image (step S504). If reduced print is permitted by using a setting switch for permitting reduced image printing on a smaller sheet provided on the MFP 101 (Yes), the image is reduced (step S505), then the process proceeds to step S506. If reduction is not permitted at step S504 (No), a print error will result and the print process will end (step S510).

At step S506, determination is made as to whether or not the number of pixels in the sub-scanning direction dest_y-width is greater than the number of pixels of in the sub-scanning direction an established sheet size. If it is determined that the number of pixels in the sub-scanning direction dest_ywidth is less than or equal to the maximum number of pixels in the sub-scanning direction that can be printed on a sheet of the established size (No), the image is printed on the sheet (step S509), and then the process will end.

On the other hand, if it is determined at step S506 that the number of pixels in the sub-scanning direction dest_ywidth is greater than the number of pixels of the sheet size (Yes), determination is made as to whether the image is permitted to be divided and printed (step S507). If image division is permitted by using the setting switch for permitting image division provided on the MFP 101 (Yes), the image is divided into sub-images (step S508) and each of the sub-images is printed (step S509). On the other hand, if permission for image division is not set (No), error handling is performed (step S510).

Figure 9:
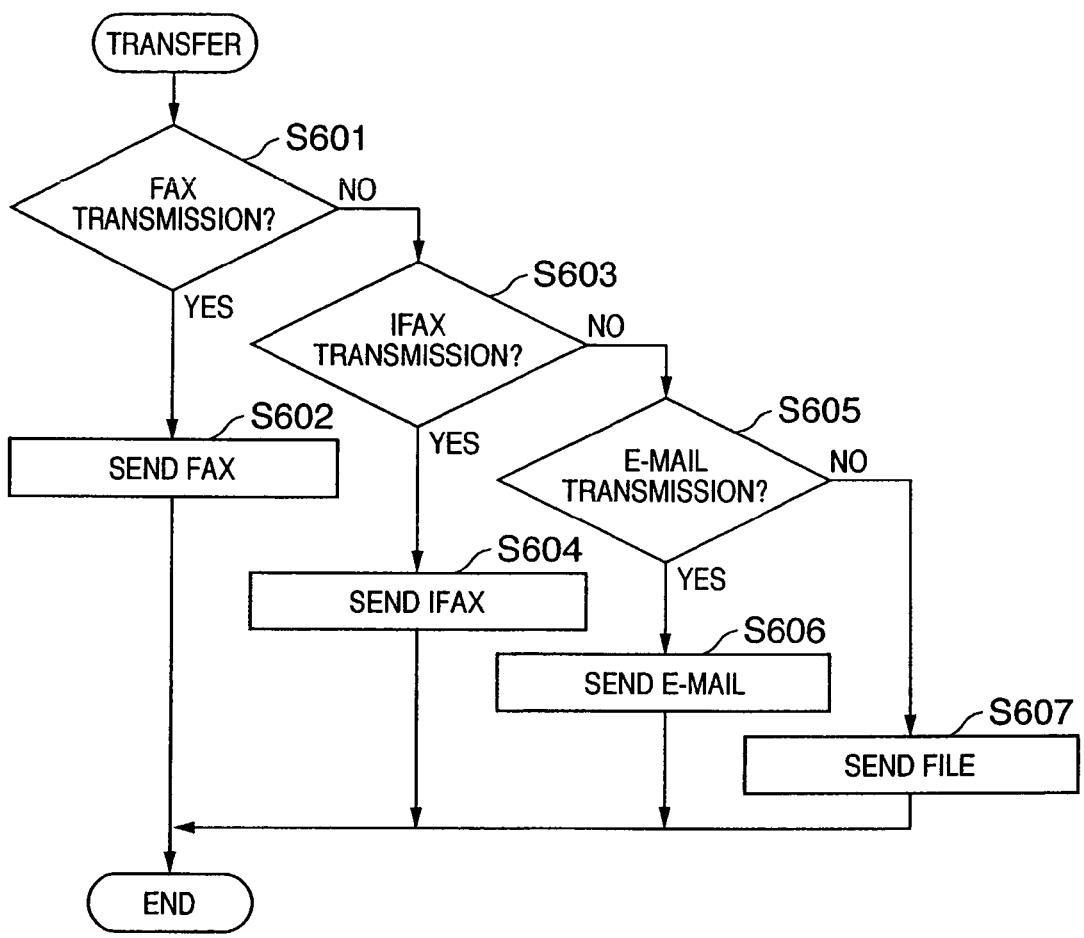
FIG. 9 is a flowchart illustrating a process for transferring an image generated on the MFP 101 through the process shown in the flowcharts in FIGS. 6 and 7 to a device.

FIG. 9 is a flowchart illustrating a process for transferring an image generated on the MFP 101 to another apparatus through the process shown in the flowcharts in FIGS. 6 and 7. First, when a transfer process is initiated (step S600), determination is made as to whether the image is to be transferred to a fax (step S601). If the image is to be transferred to a fax (Yes), the image generated through the image transformation at step S328 in the flowchart of FIG. 6 is sent to the fax specified (step S602).

On the other hand, if it is determined at step 601 that the image is not to be transferred to a facsimile (No), determination is made as to whether the image is to be transferred to an IFAX (step S603). If the image is to be transferred to an IFAX (Yes), the generated image is sent to the specified IFAX (step S604).

On the other hand, if it is determined at step 603 that the image is not to be transferred to an IFAX (No), determination is made as to whether the generated image is to be transferred as E-mail (step S605). If the image is to be transferred as E-mail (Yes), the generated image is sent to the specified E-mail address (step S606). On the other hand, if the image is not sent to an E-mail address (No), the generated image is sent to a file transfer destination such as an FTP or SMB file transfer destination (step S607).

While an embodiment has been described with respect to SMTP reception and POP reception as the method for receiving E-mail, E-mail may be received by using other protocol such as IMAP.

As has been described above, according to the present invention, a sheet size most suitable for printing an image can be selected and printed not only in the case where resolution information or pixel count information is described in the image, as in an IFAX-based image, but also in the case where resolution information or image size information is not described in the image data, as in an image obtained through E-mail reception, from a digital camera, or a portable memory medium. It will be appreciated that the present invention can also be applied to image data obtained through methods other than those mentioned above.

An embodiment of the present invention has been described in detail above. The present invention can also be embodied as a program or a storage medium (recording medium). In particular, the present invention may be applied to a system consisting of multiple devices or to a single device.

It should be noted that the present invention includes implementations achieved by directly or remotely providing a software program that implements the embodiment described above (a program corresponding to any of the flowcharts shown in the drawings of the embodiment) to a system or a device and reading and executing the program code by a computer of the system or the device.

Therefore, the program code itself that is installed in a computer in order to implement the functions and processing of the present invention also embodies the present invention. That is, the present invention includes a computer program for implementing the functions and processing of the present invention.

The computer program may take any form that has capabilities of a program, such as an object code, a program to be executed by an interpreter, or script data to be provided to an operating system.

The recording medium for providing the program may be, for example, a floppy (registered trademark) disk, a hard disk, an optical disk, a magneto-optical disk (MO), a CD-ROM, a CD-R, a CD-RW, a magnetic tape, a non-volatile memory card, a ROM, or a DVD (DVD-ROM or DVD-R)

The program of the present invention can also be provided to a computer by accessing a Web page on the Internet through a browser on the client computer and downloading the computer program itself or a compressed file including an automatic install function into a recording medium such as a hard disk. The present invention can also be implemented by dividing a program code constituting the program of the present invention into files and allowing each of the files to be downloaded from a different Web page. This means that the present invention also includes a WWW server that allows multiple users to download program files for implementing by computer the functions and processing of the present invention.

The present invention also can be implemented by delivering an encrypted program of the present invention in a storage medium such as a CD-ROM to users and allowing any of the users who satisfy predetermined conditions to download encryption key information for decrypting the encrypted program through the Internet and to use the encryption key information to execute and install the encrypted program in a computer.

Further, the functions of the above-described embodiment may be accomplished not only by executing the program read out by a computer, but also by causing an OS (operating system) running on the computer to perform part or all of the actual operations based according to instructions of the program.

Further, the functions of the above-described embodiment can be accomplished by writing the program read out from the storage medium into a memory provided in an expansion board inserted into a computer or a memory provided in an expansion unit connected to the computer and then causing a CPU or other components provided in the expansion board or the expansion unit to perform part or all of the actual operations according to instructions of the program.

According to the present invention, if information about the size of sheets on which an image obtained is to be printed is not available, the need for specifying the size of a sheet on which the image is to be printed is eliminated and the image can be printed on a sheets of a suitable size. Furthermore, if information about sheet size is not available, the image can be laid out and printed on an A4-size sheet, which is most commonly used.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-073959, filed Mar. 15, 2005, which is hereby incorporated by reference herein in its entirety.

What is claimed is:

1. An image processing apparatus comprising: an obtaining unit adapted to obtain an image; an extraction unit adapted to extract pixel count information indicating a pixel count of the obtained image from the obtained image; a determination unit adapted to determine whether or not the obtained image contains resolution information indicating a resolution of a printed image related to the obtained image; a resolution determination unit adapted to determine a resolution of a printed image related to the obtained image on the bases of the pixel count information extracted by said extraction unit in a case where said determination unit determines that the obtained image does not contain the resolution information; a sheet-size determination unit adapted to determine a sheet-size of a sheet, to be used for printing the obtained image, based on the pixel count information extracted by said extraction unit; a transformation unit adapted to transform the obtained image to a transformed-image, having a size suitable for the determined sheet-size, based on the pixel count information extracted by said extraction unit and a printing unit adapted to print the transformed-image on the sheet, the size of which is determined by said sheet-size determination unit, with the resolution determined by said resolution determination unit in a case where said determination unit determines that the obtained image does not contain the resolution information.

2. The image processing apparatus according to claim 1, further comprising a setting unit adapted to set a sheet-size larger than the sheet-size determined by said sheet-size determination unit in a case where the pixel count information extracted by said extraction unit exceeds a predetermined value,
wherein said printing unit prints the transformed-image on the sheet, the size of which is set by said setting unit with the resolution determined by said resolution determination unit.

3. The image processing apparatus according to claim 1, further comprising a sheet determination unit adapted to determine whether a sheet of the determined sheet-size is present or not prior to printing the transformed-image by said printing unit,
wherein said printing unit prints the transformed-image on a sheet larger than the sheet-size determined by said sheet-size determination unit or prints an image produced through scale-down transformation of the obtained image by said transformation unit on a sheet smaller than the sheet-size determined by said sheet-size determination unit, if said sheet determination unit determines that a sheet of the sheet-size is not present.

4. The image processing apparatus according to claim 2, further comprising a division unit adapted to divide the transformed-image into a plurality of images in a case where the size of the transformed-image transformed by said transformation unit is larger than a sheet-size set by the setting unit, wherein said printing unit prints said plurality of images resulting from the division by said division unit.

5. The image processing apparatus according to claim 1, further comprising a margin adding unit adapted to add margins to the transformed-image transformed by said transformation unit to fit the transformed-image to the sheet-size.

6. The image processing apparatus according to claim 5, wherein said margin adding unit adds margins to the transformed-image to fit the transformed-image to the sheet-size in a case where the size of the obtained image obtained by the obtaining unit is smaller than a predetermined size, the size of the transformed-image being transformed by said transformation unit so as to fit the sheet-size by interchanging the original R-direction and non-R direction of the transformed-image by said transformation unit.

7. The image processing apparatus according to claim 1, further comprising a setting unit adapted to set the sheet-size of a sheet on which the transformed-image is to be printed, on the basis of the resolution information and said pixel count information, in a case where said determination unit determines that the obtained image contains the resolution information;
wherein said printing unit prints the transformed-image transformed by said transformation unit with the same scale as the original image on a paper of the sheet-size set by said setting unit.

8. The image processing apparatus according to claim 1, wherein said obtaining unit obtains any of an image managed in another device connected to said image processing apparatus through a network and an image stored in a portable storage medium capable of being attached to and detached from said image processing apparatus.

9. An image processing method comprising the steps of: obtaining an image; extracting pixel count information indicating a pixel count of the obtained image from the obtained image; determining whether or not the obtained image contains resolution information indicating a resolution of a printed image related to the obtained image; determining a resolution of a printed image related to the obtained image on the basis of the pixel count information extracted in said step of extracting in a case where the obtained image does not contain the resolution information; determining a sheet-size of a sheet, to be used for printing the obtained image, based on the pixel count information extracted in said step of extracting; transforming the obtained image to a transformed-image, having a size suitable for the determined sheet-size, based on the pixel count information extracted in said step of extracting; and printing the transformed-image on the sheet, the size of which is determined in said step of determining the sheet-size, with the resolution determined in said step of determining the resolution in a case where the obtained image does not contain the resolution information.

10. A program stored on a computer readable storage medium for controlling an image processing apparatus which obtains and prints an image to perform the steps of: obtaining an image; extracting pixel count information indicating a pixel count of the obtained image from the obtained image; determining whether or not the obtained image contains resolution information indicating a resolution of a printed image related to the obtained image; determining a resolution of a printed image related to the obtained image on the basis of the pixel count information extracted in said step of extracting in a case where the obtained image does not contain the resolution information; determining a sheet-size of a sheet, to be used for printing the obtained image, based on the pixel count information extracted in said step of extracting; transforming the obtained image to a transformed-image, having a size suitable for the determined sheet-size based on the pixel count information extracted in said the step of extracting; and printing the transformed-image on the sheet, the size of which is determined in said step of determining the sheet-size, with the resolution determined in said step of determining the resolution in a case where the obtained image does not contain the resolution information.

11. The image processing apparatus according to claim 1, wherein said printing unit prints the obtained image on the paper, the size of which is determined by said sheet-size determination unit, with the resolution indicated by the resolution information contained in the obtained image in a case where said determination unit determines that the obtained image contains the resolution information.

* * * * *